(12) United States Patent
Kiefhaber et al.

(10) Patent No.: US 8,391,463 B1
(45) Date of Patent: Mar. 5, 2013

(54) METHOD AND APPARATUS FOR IDENTIFYING RELATED CONTACTS

(75) Inventors: Sarah H. Kiefhaber, Longmont, CO (US); Joylee Kohler, Northglenn, CO (US); Henry R. Paddock, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1610 days.

(21) Appl. No.: 11/469,798

(22) Filed: Sep. 1, 2006

(51) Int. Cl.
*H04M 3/00* (2006.01)
(52) U.S. Cl. .............. 379/265.01; 379/265.02
(58) Field of Classification Search ........... 379/201.01–201.02, 265.01–265.02
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

US 6,537,685, 03/2000, Fisher et al, (withdrawn).

(Continued)

*Primary Examiner* — Rasha Al Aubaidi
(74) *Attorney, Agent, or Firm* — Sheridan Ross P.C.

(57) ABSTRACT

Systems and methods for identifying related contacts in a contact center are provided. In particular, contacts that are initiated by an agent or other resource after an earlier contact has been placed on hold or while the agent or resource is in an after-contact work state are determined to be associated with the earlier contact. Accordingly, associations within contacts can be identified and recorded. Furthermore, the identification of associations between contacts can be performed without requiring explicit recognition of relationships between the content of different contacts, and without relying on an agent to make accurate reports regarding relationships between contacts.

23 Claims, 3 Drawing Sheets

U.S. PATENT DOCUMENTS

| | | |
|---|---|---|
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,408,066 B1 | 6/2002 | Andruska et al. |
| 6,408,277 B1 | 6/2002 | Nelken |

| Patent No. | Date | Inventor |
|---|---|---|
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,386,100 B2 | 6/2008 | Michaelis |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,545,761 B1 | 6/2009 | Kalbag |
| 7,545,925 B2 | 6/2009 | Williams |
| 7,567,653 B1 | 7/2009 | Michaelis |
| 7,734,032 B1 | 6/2010 | Kiefhaber et al. |
| 7,885,209 B1 | 2/2011 | Michaelis et al. |
| 7,936,867 B1 | 5/2011 | Hill et al. |
| 2001/0011228 A1 | 8/2001 | Shenkman |
| 2001/0034628 A1 | 10/2001 | Eder |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2002/0194096 A1 | 12/2002 | Falcone et al. |
| 2003/0004704 A1 | 1/2003 | Baron |
| 2003/0028621 A1 | 2/2003 | Furlong et al. |
| 2003/0073440 A1 | 4/2003 | Mukherjee et al. |
| 2003/0093465 A1 | 5/2003 | Flockhart et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0185379 A1 | 10/2003 | O'Connor et al. |
| 2003/0198336 A1 | 10/2003 | Rodenbusch et al. |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |

| | | | |
|---|---|---|---|
| 2004/0210475 A1 | 10/2004 | Starnes et al. | |
| 2004/0240659 A1 | 12/2004 | Gagle et al. | |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0044375 A1 | 2/2005 | Paatero et al. | |
| 2005/0049911 A1 | 3/2005 | Engelking et al. | |
| 2005/0065837 A1 | 3/2005 | Kosiba et al. | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0228707 A1 | 10/2005 | Hendrickson | |
| 2005/0261035 A1 | 11/2005 | Groskreutz et al. | |
| 2005/0283393 A1 | 12/2005 | White et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0026049 A1 | 2/2006 | Joseph et al. | |
| 2006/0056598 A1 | 3/2006 | Brandt et al. | |
| 2006/0058049 A1 | 3/2006 | McLaughlin et al. | |
| 2006/0100973 A1 | 5/2006 | McMaster et al. | |
| 2006/0135058 A1 | 6/2006 | Karabinis | |
| 2006/0167667 A1 | 7/2006 | Maturana et al. | |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1* | 11/2006 | Hackbarth et al. | 705/7 |
| 2006/0285648 A1 | 12/2006 | Wahl et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0156375 A1 | 7/2007 | Meier et al. | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2009/0193050 A1 | 7/2009 | Olson | |
| 2009/0228474 A1 | 9/2009 | Chiu et al. | |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | 0026804 | 5/2000 |
| WO | 0026816 | 5/2000 |
| WO | WO 01/80094 | 10/2001 |
| WO | WO 02/099640 | 12/2002 |
| WO | WO 03/015425 | 2/2003 |

OTHER PUBLICATIONS

U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/199,828, filed Aug. 8, 2005, Bland et al.
U.S. Appl. No. 11/242,687, filed Oct. 3, 2005, Krimstock et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendrick et al.
U.S. Appl. No. 12/242,916, filed Oct. 1, 2008, Kiefhaber et al.
U.S. Appl. No. 12/789,038, filed May 27, 2010, Bland et al.
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"KANA—Contact Center Support", available at http://www.kana.com/solutions.php?tid=46, copyright 2006, 3 pages.
"Monitoring: OneSight Call Statistics Monitors", available at http://www.empirix.com/defaultasp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Still Leaving It To Fate?: Optimizing Workforce Management", Durr, William Jr., Nov. 2001.
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.

Andy Zmolek; "Simple and Presence: Enterprise Value Propositions," Avaya presentation, 16 pages, presented Jan. 24, 2002.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Background of the Invention for the above-captioned application (previously provided).
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Berners-Lee et al.; "Uniform Resource Identifiers (URI); Generic Syntax," Network Working Group, Request for Comments 2396 (Aug. 1998), 38 pages.
Bill Michael, "The Politics of Naming" www.cConvergence.com (Jul. 2001) pp. 31-35.
Bischoff et al. "Data Ware House Building Method—practical advices telled by persons having experience and experts", Kyouritsu Shuppan Corp. May 30, 2000, first edition, pp. 197-216.

Chavez, David, et al., "Avaya MultiVantage Software: Adapting Proven Call Processing for the Transition to Converged IP Networks," Avaya, Inc., Aug. 2002.
Cherry, "Anger Management," IEEE Spectrum (Apr. 2005) (1 page).
Coles, Scott, "A Guide for Ensuring Service Quality in IP Voice Networks," Avaya, Inc., 2002, pp. 1-17.
Songini, "ETL QuickStudy," ComputerWorld, accessed at http://www.computerworld.com/databasetopics/businessintelligence/datawarehouse/story/..., copyright 2005, 5 pages.
Creating and Using Data Warehouse Dimension Tables (Microsoft) copyright 2005, http://msdn.microsoft.com/library/en-us/createdw/createdw_10kz.asp?frame=true, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
"CS 345: Topics in Data Warehousing," Oct. 5, 2004, 36 pages.
Data Warehouse—Surrogate Keys, Keep Control Over Record Identifiers by Generating New Keys for the Data Warehouse, Ralph Kimball, May 1998, 4 pages.
Data Warehouse Designer—Design Constraints and Unavoidable Realities, No design Problem in School was This Hard, Ralph Kimball, Sep. 3, 2002, 3 pages.
Data Warehouse Designer—An Engineer' s View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Three: Handling Time, Ralph Kimball, Apr. 22, 2003, 3 pages.
Data Warehouse Designer—The Soul of the Data Warehouse, Part Two: Drilling Across, Ralph Kimball, Apr. 5, 2003, 3 pages.
Data Warehouse Designer—Two Powerful Ideas, The Foundation for Modern Data Warehousing, Ralph Kimball, Sep. 17, 2002, 3 pages.
Data Warehouse Designer Fact Tables and Dimension, Jan. 1, 2003, http://www.inteeigententerprise.com/030101/602warehouse1_1.jhtml, Ralph Kimball, 3 page.
Dawson et al.; "Vcard MIME Directory Profile," Network Working Group (Sep. 1998), available at http://www.ietf.org/rfc/rfc2426.txt?number=2426, 40 pages.
Dawson, "NPRI's Powerguide, Software Overview" Call Center Magazine (Jun. 1993), p. 85.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
Definity Communications System Generic 3 Call Vectoring/Expert Agent Selection (EAS) Guide, AT&T publication No. 555-230-520 (Issue 3, Nov. 1993).
Dillion, "Renaming fields and tracing dependencies", available at http://allenbrowne.com/ser-41.html, Nov. 2003, updated May 2006, 1 page.
DMReview—Business Dimensional Modeling: The Logical Next Step: Translating the BDM, Laura Reeves, published May 2004, 4 pages.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.

E. Veerman, "Designing A Dimensional Model", date unknown, 38 pages.
Fielding et al.; "Hypertext Transfer Protocol—HTTP/1.1," Network Working Group, Request for Comments 2068 (Jan. 1997), 152 pages.
Foster, Robin, et al., "Avaya Business Advocate and its Relationship to Multi-Site Load Balancing Applications," Avaya, Inc., Mar. 2002, 14 pages.
Fundamentals of Data Warehousing—Unit 3—Dimensional Modeling, Fundamentals of Data Warehousing, copyright 2005—Evolve Computer Solutions, 55 pages.
G. Hellstrom et al., "RFC 2793—RTP Payload for Text Consersation," Network Working Group Request for Comments 2793 (May 2000), available at http://www.faqs.org/rfcs/rfc2793.html, 8 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
G. Wiederhold, "Mediation to Deal with Heterogeneous Data Sources", Stanford University, Jan. 1999, 19 pages.
GEOTEL Communications Corporation Web site printout entitled "Intelligent CallRouter Optimizing the Interaction Between Customers and Answering Resources.", 1998, 6 pages.
Glossary—Curlingstone Publishing, http://www.curlingstone.com/7002/7002glossary.html, downloaded May 24, 2005, 11 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
J. Cahoon, "Fast Development of a Data Warehouse Using MOF, CWM and Code Generation", CubeModel, May 22, 2006, 32 pages.
Bentley, "Metadata: Everyone Talks About It, But What Is It?" Proceedings of the Twenty-Sixth Annual SAS Users Group International Conference: SAS Institute Inc., 2001, Paper 125-26, 5 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Kimball, et al., "Practical Techniques for Extracting, Cleaning, Conforming, and Delivering Data." The Data Warehouse ETL Toolkit. 2004. Ch. 5, pp. 170-174.
Kimball, et al., "The Complete Guide to Dimensional Modeling." The Data Warehouse Toolkit. 2nd Edition, 2002. Ch. 11, pp. 240-241.
Koutarou, "Building a Framework for EC using Hibernate, OSWorkflow", JAVA Press, Japan, Gujutsu Hyouron Company, vol. 25, 2004, pp. 132-147.
L. Cabibbo et al., "An Architecture for Data Warehousing Supporting Data Independence and Interoperability", International Journal of Cooperative Information Systems, Nov. 2004, 41 pages.
Lamel et al., "Language Identification Using Phone-Based Acoustic Likelihood," IEEE International Conference on Acoustics, Speech, and Signal Processing, 1994, vol. 1, pp. 293-296.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
Microsoft Office Animated Help Tool, date unknown, 1 page.
Microsoft R Access 97 for Windows R Application development guide, Ver. 8.0, Microsoft Corp., a first version, pp. 569-599.
MIT Project Oxygen, Pervasive, Human-Centered Computing (MIT Laboratory for Computer Science) (Jun. 2000) pp. 1-15.
Multi-Dimensional Modeling with BW ASAP for BW Accelerator Business Information Warehouse, copyright 2000, 71 pages.
Nice Systems—"Insight from Interactions," "Overwhelmed by the Amount of Data at your Contact Center?" http://www.nice.com/products/multimedia/analyzer.php, (Printed May 19, 2005) (2 pages).
Nice Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segId=0&parID=0&catID=-9191&rend_id... (Copyright 1999-2005) (1page).
Presentation by Victor Zue, The MIT Oxygen Project, MIT Laboratory for Computer Science (Apr. 25-26, 2000) 9 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sarda, "Temporal Issues in Data Warehouse Systems", 1999, Database Applications in Non-Traditional Environments (DANTE'99), S. 27, DOI: 10.1109/DANTE.1999.844938.
Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Snape, James, "Time Dimension and Time Zones." 2004. pp. 1-10. http://www.jamessnape.me.uk/blog/CommentView.gui,79e910a1-0150-4452-bda3-e98d.
Stevenson et al.; "Name Resolution in Network and Systems Management Environments"; http://netman.cit.buffalo.edu/Doc/DStevenson/NR-NMSE.html; printed Mar. 31, 2003; 16 pages.
Sugano et al., "Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Thayer Watkins, "Cost Benefit Analysis", 1999, San Jose State University Economics Department, Web Archive http://web.arch ive.org/web/19990225143131/http://www.sjsu.edu/faculty/watkins/cba.htm.
Akitsu, "An Introduction of Run Time Library for C Program, the fourth round," C Magazine, Jul. 1, 1990, vol. 2(7), pp. 78-83.
Emura, "Windows API Utilization Guide, Points for Knowledges and Technologies," C Magazine, Oct. 1, 2005, vol. 17(10), pp. 147-150.
Examiner's Office Letter (including translation) for Japanese Patent Application No. 2007-043414, mailed Jul. 7, 2010.
Moss et al., "The Importance of Data Modeling as a Foundation for Business Insight," copyright 2004, 38 pages.
Hellstrom et al., RFC-4103 Protocol, entitled "RTP Payload for Text Conversation," Network Working Group, http://www.rfc-editor.org/rfc/rfc4103.txt, Jun. 2005, 18 pages.
Venkatesan et al., "A Customer Lifetime Value Framework for Customer Selection and Resource Allocation Strategy," Journal of Marketing, Oct. 2004, vol. 68, pp. 106-125.
U.S. Appl. No. 11/956,779, filed Dec. 14, 2007, Burritt et al.
Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom..., 1 page.

Overview of Avaya IP Softphone printed on Sep. 15, 2009 from http://support.avaya.com/elmodocs2/ip_softphone/Overview_IP_Softphone_R6.htm, 2 pages.

U.S. Appl. No. 12/569,581, filed Sep. 29, 2009, Michaelis.

Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age..., 1 page.

Product Description of "Avaya one-X Agent," printed on Sep. 15, 2009 from http://www.avaya.com/usa/product/avaya-one-x-agent, 1 page.

Product Overview of "IP Softphone" printed on Sep. 15, 2009 from http://www.nacr.com/Products.aspx?id=236, 3 pages.

US 6,537,685, 03/2003, Higuchi (withdrawn)

* cited by examiner

METHOD AND APPARATUS FOR IDENTIFYING RELATED CONTACTS

FIELD OF THE INVENTION

The present invention relates to the association of contacts handled by a resource.

BACKGROUND

Various systems have been developed to allocate work among resources or agents associated with an enterprise. For example, automatic call distribution systems are available that are capable of distributing calls or other contacts to call or contact handling agents according to some predefined criteria. Enterprises would like to know the costs associated with serving and selling to their customers using contact handling agents. They also would like to know not just how their contact center agents spend their time, but what they are working on and who they are serving when they do that work. In addition, in order to meet service level targets, it is important that agents occupy themselves with work-related contacts or aftercontact work as fully as reasonably possible. Accordingly, it is desirable to account for how agents spend their time and for whom.

In this regard, it has been impractical or impossible for contact distribution systems to associate related contacts. Instead, contact distribution systems have been able to collect information about incoming contacts only, as the customer or other person initiating the contact will typically dial a number or sequence of numbers, or otherwise address their contact such that information regarding the nature of and/or reason for the contact can be determined. However, there has been no way to efficiently or accurately determine whether contacts initiated by an agent are associated with work-related contacts, or are not work-related. In particular, systems that have attempted to track contacts initiated by the agent that are available or that have been proposed depend on the agent to accurately enter information, or on complex speech recognition systems. Furthermore, although systems have had at least a limited capability to record agent contacts and allow later analysis of those contacts, interrelations between contacts are not shown by such systems.

SUMMARY

The present invention is directed to solving these and other problems and disadvantages of the prior art. According to embodiments of the present invention, each incoming contact received at a contact center and assigned to a resource for handling can be associated with later contacts initiated by the resource using proximity. In particular, when the next system action performed by a resource after placing a contact on hold or after terminating a contact and entering an after-contact work state comprises a contact initiated by the resource, the resource-initiated contact is associated with the previous incoming contact. This information is recorded to allow for the generation of reports that can indicate to a supervisor, administrator or other reviewing entity that the incoming call and the resource-initiated contact are related to one another. Accordingly, the time spent on a single matter can be more accurately tracked and accounted for.

In accordance with at least some embodiments of the present invention, an adjunct to a contact center is provided for determining whether contacts are related to one another and for recording information concerning determined relations. More particularly, the adjunct, hereinafter referred to herein as a related contact identification server, may execute an application comprising an algorithm for determining whether a set of contacts are related and whether information indicating that the set of contacts are related should be recorded. The application generally assumes that a contact initiated by a resource while a contact earlier received by that resource has been placed in a particular state is related to the earlier contact. Accordingly, the algorithm may be considered heuristic, in that it operates by assuming a relationship between such contacts. In accordance with further embodiments of the present invention, the received contact must be placed on hold or in an after-contact work state (also referred to as wrap-up state) in order for it to be associated with one or more contacts later initiated by the resource.

Accordingly, embodiments of the present invention relate two contacts together in a parent-child relationship by recognizing the parent as the last contact put on hold or the last contact terminated before an agent entered an after-contact work state before a new contact is initiated by the agent or party putting the parent on hold. The second contact is referred to as the child. A parent can have multiple children and a child can have multiple parents in the case where two contacts are merged, such as a meet-me conference. The algorithm is also recursive so that a child of a child has a parent who is the original contact. This information is stored with other information about the contact, such as who the parties are, when it took place, etc. In addition, a customer designation or other identifier can be attached to a party external to the contact center with respect to all contacts related via the parent-child relationship. In accordance with still other embodiments of the present invention, contacts are linked across media. For example, an agent working on an email can suspend the work to make a voice call to another agent. In this case, the email becomes the parent to the related voice call (the child).

These and other advantages and features of the present invention will become more apparent from the following description of illustrative embodiments of the invention, taken together with the drawings.

DETAILED DESCRIPTION

Figure 1:
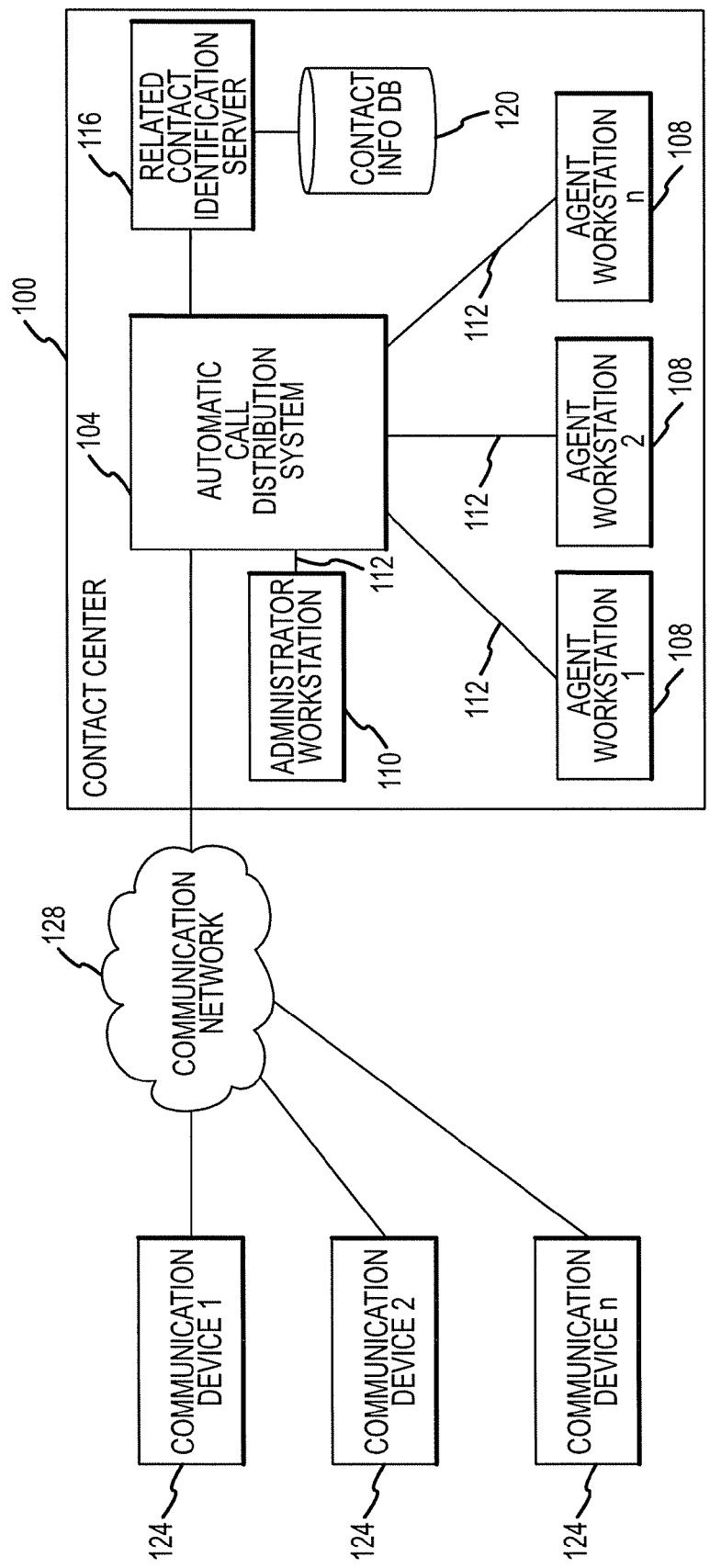
FIG. 1 is a block diagram of a communication arrangement incorporating a contact center in accordance with embodiments of the present invention.

FIG. 1 is a block diagram of an illustrative contact center 100 such as may be used in accordance with embodiments of the present invention. The contact center 100 generally includes an automatic contact (or call) distribution system (ACD) 104 interconnected to a plurality of agent positions or workstations 108. The ACD system 104 is illustratively the MultiVantage™ Enterprise Communications System based ACD system available from Avaya Inc. Each agent workstation 108 includes a voice and/or data terminal for use by a corresponding agent in handling contacts. In addition to the agent workstations 108, one or more administrator workstations 110 may be included in or associated with the contact center 100. The agent workstations 108 and administrator workstations 110 may be connected to the ACD system 104 by a voice and/or data transmission medium or network 112. Also connected to the ACD system 104 is a related contact identification system or server 116 that serves as an adjunct to the ACD system 104 and that monitors contacts and determines whether a set of contacts are related to one another, as described herein. The related contact identification system 116 also gathers contact records and information concerning determined relations for recording or storage in a contact information database 120.

The ACD system 104 generally functions to connect agent workstations to communication devices or endpoints 124, also referred to herein as external communication endpoints 124, through a communication network 128. Examples of external communication endpoints 124 include voice telephony devices, such as plain old telephone system (POTS) telephones and Internet protocol (IP) telephones. Other examples of external communication endpoints 124 include video phones and devices capable of supporting textual communications, such as email, instant messaging or text messaging communications.

The communication network 128 may comprise one or more networks of one or more types. For example, the communication network 128 may comprise the public switched telephony network (PSTN), and/or an Internet protocol network, such as the Internet.

Figure 2:
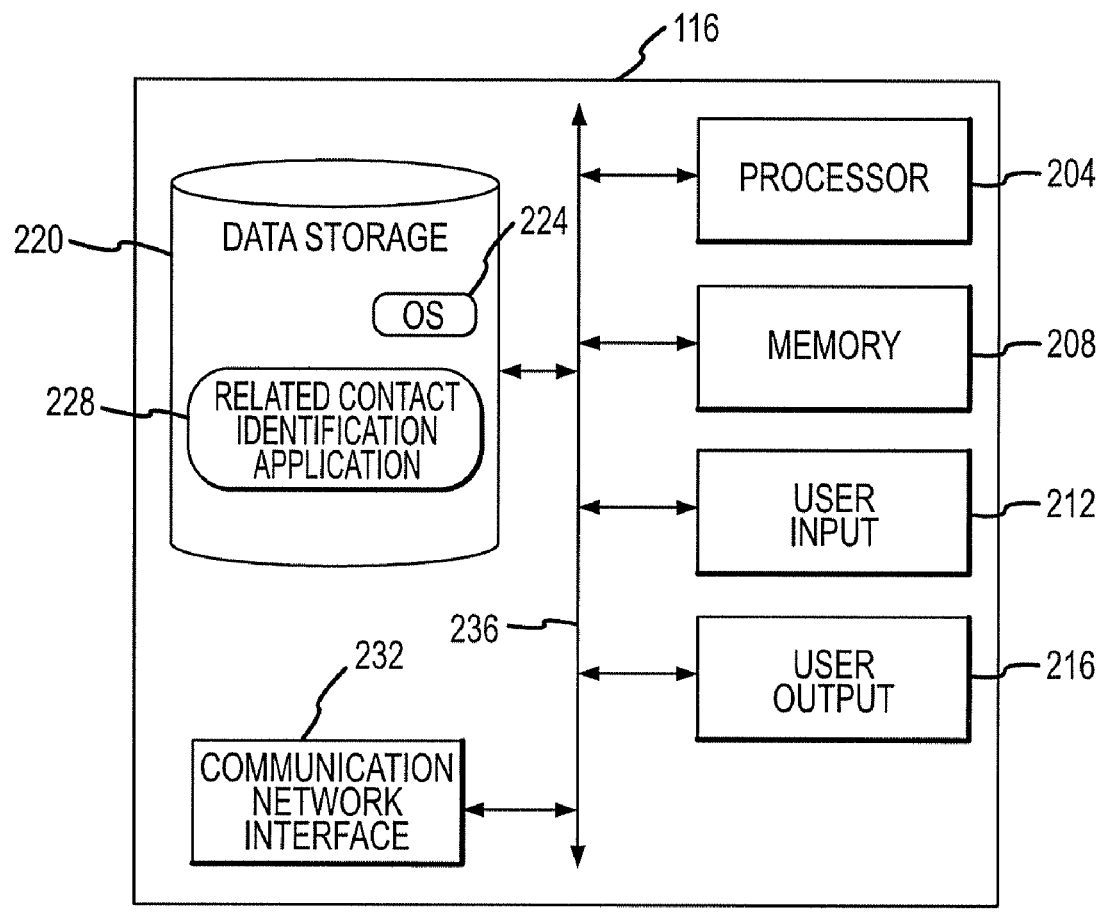
FIG. 2 is a block diagram of a related contact identification server in accordance with embodiments of the present invention.

FIG. 2 is a block diagram depicting a related contact identification system or server 116 in accordance with embodiments of the present invention. The components may include a processor 204 capable of executing program instructions. Accordingly, the processor 204 may include any general purpose programmable processor or controller for executing application programming. Alternatively, the processor may comprise a specially configured application-specific integrated circuit (ASIC). The processor 204 generally functions to run programming code implementing various functions performed by the related contact identification server 116. For example, such functions may include the identification of related contacts and the recording and/or reporting of related contacts associated with a contact center 100.

A related contact identification server 116 may additionally include memory 208 for use in connection with the execution of programming by the processor 204, and for the temporary or long term storage of data or program instructions. For example, the memory 208 may be used in connection with the operation of a related contact identification application. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a microphone, keyboard, numeric keypad, scanner and pointing device combined with a screen or other position encoder. Examples of user output devices 216 include a speaker, alphanumeric display, ringer, printer port, compact flash or other removable memory port, and a printer. In general, user input 212 and user output devices 216 are used by an administrator or manager to configure the related contact identification server 116. Although the user inputs 212 and outputs 216 are shown as being directly connected to the related contact identification server 116, it should be appreciated that an administrator or manager may alternatively or additionally access the related contact identification server 116 remotely, for example through an agent workstation 108 or through an administrator workstation 110.

A related contact identification server 116 may also include data storage 220 for the storage of application programming and/or data. For example, operating system software 224 may be stored in the data storage 220. The related contact identification server 116 also generally includes a related contact identification application 228 stored in the data storage 220. The related contact identification application 228 generally provides the instructions that are executed in order to identify related contacts and to provide information related to those contacts to the contact information database 120, or to otherwise create a record of related contacts. Furthermore, although embodiments of the present invention implement a related contact identification algorithm described herein through execution of programming code provided as part of a related contact identification application 228, other embodiments may execute instructions that are stored as firmware or that is encoded in logic circuits in order to implement the related contact identification algorithm.

A related contact identification server 116 in accordance with embodiments of the present invention may also include one or more communication network interfaces 232. Examples of communication network interfaces 232 include a packet data network interface such as a wired or wireless Ethernet interface, or a Fibre channel interface. For example, the related contact identification server 116 may be interconnected to the ACD system 104 by an Ethernet or other IP connection. As a further example, the related contact identification server 116 may be interconnected to the contact information database 120 by a Fibre channel interface. A related contact identification server 116 may additionally include a communication bus 236 to allow communications between the various components of the device.

Figure 3:
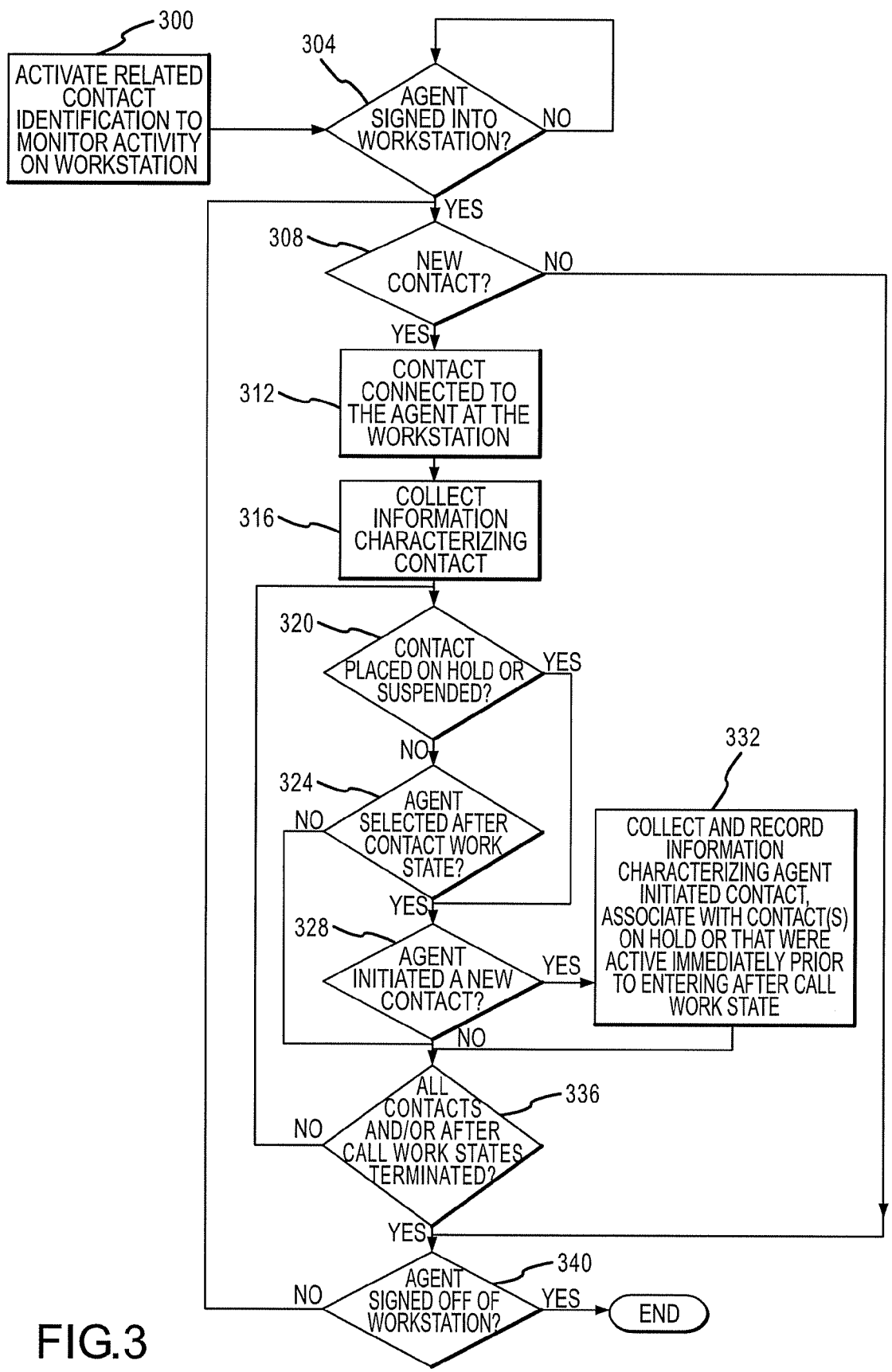
FIG. 3 is a flow diagram illustrating a process for associating contacts in accordance with embodiments of the present invention.

FIG. 3 is a flow chart illustrating aspects of the operation of a contact center 100 incorporating a related contact identification system or server 116 or other system, implementing or running a related contact identification algorithm, such as a related contact identification application 228, as described herein. Initially, the related contact identification application is activated to monitor activity on at least one workstation 108 associated with the contact center 100 (step 300). Activation may comprise enabling or running the related contact identification application for all or a selected subset of the agents associated with the contact center by selecting all or some of the agent workstations 108 included in the contact center 100. In order to simplify the description, it will be assumed that a single agent workstation 108 has been selected for monitoring for related contacts. However, it should be appreciated that embodiments of the present invention are not limited to monitoring a single agent workstation 108, and instead may monitor all or a number of workstations 108.

At step 304, a determination is made as to whether an agent is signed into the monitored workstation 108. If an agent is not signed into the workstation 108, the process may idle at step 304. Once it is determined that an agent has signed into a monitored workstation 108, a determination is made as to whether an incoming or outgoing contact has been routed to or is associated with that workstation 108 (step 308). If the workstation 108 has received a contact, the contact is connected to the agent at the workstation 108 (step 312). Connecting a contact to the agent at the workstation 108 can comprise, for example, the agent choosing to accept an incoming telephone call by pressing an appropriate key or button, by lifting a telephone handset, or being automatically connected to a call by the system. Other examples of connecting a contact to an agent include the agent selecting and reading an incoming message comprising text, such as an e-mail or text messaging system message; a web chat session;

or an outgoing contact initiated by a predictive dialer. At step 316, information characterizing the contact is collected. Collecting information may include associating information derived from entries made by a party initiating the contact. For example, a typical call center will have different telephone numbers or menu items under a telephone number that are associated with particular categories of inquiry or topics. Accordingly, knowledge of the number or numbers that were dialed in connection with initiating an incoming contact can be used to gain information about the contact. Other information may be captured separately from the number or numbers that were dialed. For instance, caller identification information may be captured. Furthermore, although the dialing of telephone numbers has been used as an example, it should be appreciated that embodiments of the present invention are not be limited to contacts comprising telephone calls. Instead, information characterizing contacts comprising textual communications can be collected. For example, information entered by the party initiating the contact as part of completing a contact request form or derived from an address for the message used by the initiating party can be used to characterize an incoming contact. Information regarding the agent can also be collected and associated with information regarding the contact. As can be appreciated by one of skill in the art, collecting information can include storing information, for example in a contact information database 120.

At step 320, a determination is made as to whether the agent at the workstation 108 has placed the contact on hold or suspended it. In general, a contact may be placed on hold by suspending the immediate entry of communication data (e.g. speech or text) but without terminating the contact. Accordingly, placing a contact on hold can comprise selecting a hold state with respect to the contact, or simply keeping a chat window or session open while not actively reading or responding to a received message. A contact can also be considered on hold or suspended for purposes of identifying related contacts by placing a contact in a "preview" state and then placing another contact.

If it is determined at step 320 that the incoming contact has not been placed on hold, a determination may next be made as to whether the agent at the workstation 108 has selected an after-contact work state (step 324). As can be appreciated by one of skill in the art, an agent in a call center may enter an after-contact work state when performing work related to a previous contact. In a conventional call center, an after-contact work state allows an agent to avoid being assigned to handle new contacts while the agent is performing work related to a previous contact. In accordance with embodiments of the present invention, the after-contact work state is also used to determine whether two contacts are related to one another, as described herein.

After a determination at step 320 that the incoming contact has been placed on hold or after a determination at step 324 that the agent has selected an after-contact work state, a determination is next made as to whether the agent at the monitored workstation 108 has initiated a new contact (step 328). In particular, if the agent initiates a new contact while a previous contact is on hold or while the agent is in an after-contact work state, the agent-initiated contact is considered or determined to be related to the earlier contact that is on hold or to the contact associated with the agent's after-contact work state. More particularly, the contact on hold or that was last handled by an agent in an after-contact work state is considered to be the parent of a child comprising the agent-initiated contact. Accordingly, after making a determination that an agent has initiated a contact while an earlier contact is on hold or while the agent is in an after-contact work state, information characterizing the agent-initiated contact is collected and the agent-initiated contact is shown as being associated with or related to (i.e. a child of) the contact on hold or that was active immediately prior to entering the after-contact work state (step 332). Furthermore, the collected information and the determined associations between contacts are recorded, for example in the contact information database 120. In accordance with embodiments of the present invention, an 'identifier,' such as a customer designation, can be assigned to related contacts. As a result, the total time and cost related to particular customers or customer engagements can be computed and reported.

After collecting and recording information at step 332, or after determining that a contact has not been placed on hold or that an after-contact work state has not been entered, a determination may be made as to whether all contacts associated with the network workstation and/or after-contact work states have been terminated (step 336). If any contacts remain active, the process may return to step 320. Accordingly, embodiments of the present invention may determine that more than two contacts are associated with one another. If it is determined at step 336 that all associated contacts or after-contact work states have been terminated, or if it is determined at step 308 that there is no new contact, a determination may next be made as to whether the agent has signed off the monitored workstation 108 (step 340). If the agent has not signed off, the process may return to step 308, to wait for a new contact. If the agent has signed off of the workstation 108, the process may end. Accordingly, it can be appreciated that embodiments of the present invention can continuously or substantially continuously monitor for related contacts and record information concerning contacts that are determined to be related.

Where two contacts are merged, such as in a meet-me conference, a child can have multiple parents. Furthermore, multiple generations of related contacts can be tracked by embodiments of the present invention. Moreover, a child comprising a contact initiated from a first workstation to a second workstation can be the parent of a contact initiated by the second workstation. In addition, a second contact initiated by a first workstation 108 can continue to be tracked as being associated with a first contact that was placed on hold or suspended or associated with an after-contact work state when the second contact was initiated, even if the first workstation 108 drops from the second contact, for example after transferring the second contact to a second workstation or resource or creating a conference scenario with a second workstation or resource. Embodiments of the present invention can also track associations between contacts across different media types. For example, an incoming contact comprising a telephone call can be related to an email message sent by an agent after the initial contact has been placed on hold or after the initial contact has been terminated and the agent has entered an after-contact work state.

Although the foregoing description has used as examples a system comprising a call center staffed by human agents, it should be appreciated that the present invention is not so limited. For example, embodiments of the present invention may be utilized in connection with the relation of contacts or other transactions handled by a resource of any type. Furthermore, in addition to substantially real-time call distribution system applications, the present invention may be applied to systems used to distribute work items comprising textual correspondence to resources for action and possible reply. Embodiments of the present invention are also not limited to operation on an adjunct to an automatic contact distribution system. For example, embodiments of the present invention may be implemented as an application or firmware running on an automatic contact distribution system itself. In accordance with still other embodiments of the present invention, an implementing application or firmware may run on an adjunct to a communication server, such as a private branch exchange.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for associating contacts, comprising:
    one of receiving and initiating a first contact at a first contact center;
    assigning the first contact to a first resource;
    recording information related to the first contact;
    the first resource taking a first action including one of: a) placing the first contact on hold, or b) terminating the first contact and entering an after-contact work state associated with the terminated first contact;
    after taking the first action, and while the first contact is on hold or while the first resource is in an after-contact work state associated with termination of the first contact, the first resource initiating the establishment of a second contact; and
    recording information related to the second contact, wherein, in response to the first resource initiating the establishment of a second contact while the first contact is on hold or while the first resource is in the after-contact work state following termination of the first contact, the first and second contacts are indicated as being related to one another, and wherein an indication that the first and second contacts are related to one another is included in the recorded information related to the first contact and the recorded information related to the second contact.

2. The method of claim 1, wherein the first resource places the first contact on hold, and wherein the first resource then establishes the second contact while the first contact is on hold.

3. The method of claim 2, wherein the first contact comprises a voice telephony call.

4. The method of claim 2, wherein the first contact comprises an exchange of textual information, and wherein placing the first contact on hold includes the first resource temporarily suspending the entry of textual information by at least the first resource in connection with the first contact.

5. The method of claim 1, wherein the first contact is terminated, wherein the first resource enters an after-contact work state, and wherein the first resource establishes the second contact while in the after-contact work state.

6. The method of claim 1, wherein the second contact comprises an internal communication with a second resource.

7. The method of claim 1, wherein the second contact comprises an external communication with a second resource.

8. The method of claim 1, further comprising:
    the first resource taking a second action including one of a) placing the second contact on hold, or b) terminating the second contact and entering an after-contact work state;
    after taking the second action, the first resource establishing a third contact; and
    recording information related to the third contact, wherein the first, second and third contacts are indicated as being related to one another.

9. The method of claim 1, further comprising assigning a first identifier to said first and second contacts.

10. The method of claim 1, wherein the first resource establishing a second contact includes the first resource communicating with a second resource, the method further comprising:
    the second resource establishing a third contact; and
    recording information related to the third contact, wherein the first, second and third contacts are indicated as being related to one another.

11. The method of claim 1, wherein the first resource comprises an agent, and wherein the agent is not allowed to modify the recorded information.

12. The method of claim 1, further comprising:
    generating a report, wherein said report indicates said first and second contacts as being related to one another.

13. The method of claim 1, wherein said first contact is received at the contact center from a first network, and wherein the second contact is placed over a second network.

14. A system for recording information related to a call center, comprising:
    a plurality of workstations, wherein at least some of the workstations are each associated with at least one of the agents, wherein each workstation can initiate and receive contacts, and wherein each workstation can at least one of: a) place a contact on hold, or b) allow an associated agent to select an after-contact work state after a contact has been terminated;
    a contact distribution system interconnected to the plurality of workstations and to at least a first communication network, wherein the contact distribution system at least one of receives incoming contacts from and places outgoing contacts on the at least a first communication network, wherein the contact distribution system assigns or attempts to assign each incoming or outgoing contact to an agent at a workstation, and wherein the contact distribution system collects information related to each incoming or outgoing contact;
    data storage; and
    a related contact identification server interconnected to the contact distribution system, wherein information related to each incoming or outgoing contact collected by the contact distribution system is received by the related contact identification server, wherein the related contact identification server determines that a first workstation included in the plurality of workstations has initiated a second contact while a first contact assigned to the first workstation is one of: a) placed on hold, or b) terminated and associated with an after-contact work state, and wherein, in response to the related contact identification server determining that the first workstation has initiated a second contact while the first contact is one of placed on hold or terminated and associated with an after-contact work state, the related contact identification server stores information including the association of the contact initiated from the first workstation and the incoming or outgoing contact in the data storage.

15. The system of claim 14, wherein the related contact identification server is integral to the call distribution system.

16. The system of claim 14, wherein the contact comprises a voice telephony call, wherein the first communication network comprises the public switched telephony network.

17. The system of claim 16, wherein the workstations include a voice telephone.

18. The system of claim 14, wherein the call distribution system is interconnected to the workstations by a second network.

19. The system of claim 14, wherein the contact comprises an exchange of messages comprising text.

20. A non-transitory computer readable medium having stored thereon computer executable instructions, comprising:
- instructions for interfacing a plurality of agent work stations with a communication network;
- instructions for receiving or initiating contacts in connection with communication endpoints;
- instructions for placing agents the agent workstations in communication with said communication endpoints external to said contact center;
- instructions for selecting one of the agent workstations to handle a contact received at or initiated from said contact center, wherein in response to a first contact, said instructions for selecting one of the agent workstations operate to assign said first contact to a first of the agent workstation;
- instructions for collecting information related to said first contact;
- instructions for associating a second contact initiated from said first agent workstation, wherein said first and second contacts are determined to be associated with one another in response to said initiation of said second contact while said first contact is on hold or when said second contact is initiated as the next action taken at the first agent workstation following the selection of an after-contact work state at said first agent workstation, and wherein said first and second contacts are recorded as being associated with one another by the creation of at least a first record indicating that said first and second contacts are related to one another.

21. The non-transitory computer readable medium of claim 20, wherein said second contact comprises a contact placed to a second agent workstation.

22. The non-transitory computer readable medium of claim 20, wherein said first contact is initiated by a first communication endpoint, and wherein said second contact comprises a contact placed to a second communication endpoint.

23. The non-transitory computer readable medium of claim 20, further comprising: instructions for recording said association between said first and second contacts.

\* \* \* \* \*

UNITED STATES PATENT AND TRADEMARK OFFICE
CERTIFICATE OF CORRECTION

| | | |
|---|---|---|
| PATENT NO. | : 8,391,463 B1 | |
| APPLICATION NO. | : 11/469798 | |
| DATED | : March 5, 2013 | |
| INVENTOR(S) | : Sarah H. Kiefhaber et al. | |

It is certified that error appears in the above-identified patent and that said Letters Patent is hereby corrected as shown below:

In the Claims:

Column 9, in Claim 20, line 19, please delete "agents".

Column 9, in Claim 20, line 26, please delete "of the".

Signed and Sealed this
Ninth Day of July, 2013

Teresa Stanek Rea
*Acting Director of the United States Patent and Trademark Office*